United States Patent
Kinashi et al.

(10) Patent No.: US 7,372,181 B2
(45) Date of Patent: May 13, 2008

(54) ROTOR FOR BRUSHLESS MOTOR AND BRUSHLESS MOTOR

(75) Inventors: Yoshikazu Kinashi, Hyogo (JP); Masatoshi Nakao, Hyogo (JP)

(73) Assignee: Ichinomiya Denki Co., Ltd., Hyogo (JP)

( * ) Notice: Subject to any disclaimer, the term of this patent is extended or adjusted under 35 U.S.C. 154(b) by 72 days.

(21) Appl. No.: 11/099,515

(22) Filed: Apr. 6, 2005

(65) Prior Publication Data
US 2005/0225190 A1    Oct. 13, 2005

(30) Foreign Application Priority Data
Apr. 12, 2004  (JP)  ............... P2004-116619

(51) Int. Cl.
  H02K 1/22  (2006.01)
  H02K 1/27  (2006.01)
  H02K 1/28  (2006.01)
(52) U.S. Cl. ............... 310/156.13; 310/156.21
(58) Field of Classification Search ......... 310/156.08, 310/156.13, 156.43, 216, 156.14, 156.21, 310/156.28–156.31
See application file for complete search history.

(56) References Cited

U.S. PATENT DOCUMENTS

| | | | | |
|---|---|---|---|---|
| 3,502,922 A | * | 3/1970 | Welker | 310/172 |
| 3,826,941 A | * | 7/1974 | Folmar | 310/217 |
| 4,547,758 A | * | 10/1985 | Shimizu et al. | 335/302 |
| 5,786,651 A | * | 7/1998 | Suzuki | 310/259 |
| 5,881,447 A | * | 3/1999 | Molnar | 29/598 |
| 6,084,330 A | * | 7/2000 | Fisher et al. | 310/91 |
| 6,384,502 B1 | * | 5/2002 | Masuzawa et al. | 310/152 |
| 6,583,530 B2 | * | 6/2003 | Hsu | 310/254 |

FOREIGN PATENT DOCUMENTS

| | | |
|---|---|---|
| JP | 2001-178042 | 6/2001 |
| JP | 2003-174745 | 6/2003 |
| WO | WO9912248 A1 * | 3/1999 |

* cited by examiner

*Primary Examiner*—Tran Nguyen
(74) *Attorney, Agent, or Firm*—Edwards Angell Palmer & Dodge LLP (57) ABSTRACT

A rotor for a brushless motor which can securely prevent an idle running and a scattering of a magnet while restricting a manufacturing cost as low as possible. The rotor is provided with a sintered ring magnet in which not-ground recess portions are formed in an axial direction of a inner peripheral surface in correspondence to a magnetic pole, and a portion between the recess portions is ground in an inner peripheral surface having a desired inner diameter, a rotor yoke in which convex portions each having a larger diameter than the inner diameter of the sintered ring magnet are formed in an axial direction of an outer peripheral surface in correspondence to the recess portion, and a through hole is pierced in an axial center, and which is concentrically adhered to the sintered ring magnet by fitting the recess portions and the convex portions, and a shaft inserted and fitted to the through hole of the rotor yoke.

8 Claims, 7 Drawing Sheets

ROTOR FOR BRUSHLESS MOTOR AND BRUSHLESS MOTOR

BACKGROUND OF THE INVENTION

1. Field of the Invention

The present invention relates to a structure of a rotor for a brushless motor provided with a sintered ring magnet.

2. Description of the Related Art

Various motors such as an induction motor, a commutator motor and the like have been conventionally used as a motor, however, a brushless motor having a high performance has been frequently used in recent years. In an inner rotor type brushless motor which is one of the brushless motor types, a magnet is arranged in an outer periphery of a rotor forming an inner rotor and is fixed to a rotor yoke by an adhesive agent. The magnet includes a so-called segment type in which a plurality of magnet pieces are arranged in a peripheral direction in correspondence to a number of poles of the brushless motor, and a ring magnet which is formed in a cylindrical shape and is magnetized in multi poles in a peripheral direction. However, in the segment type, an adhesive strength is weakened as a result of a temperature increase, and there is a risk that the magnet pieces are scattered in a centrifugal direction on the basis of the rotation of the rotor, and there is a problem that a reliability of the magnet pieces against the scattering is lowered if the number of the magnetic poles of the rotor is increased.

In order to prevent the magnet pieces from being scattered, there has been invented a structure in which a metal cylinder body is provided as a scatter preventing member in an outer periphery of the rotor, and a so-called magnet interior type structure in which holes are provided in a peripheral edge portion along an outer peripheral surface of the rotor yoke, and a magnet piece is fitted and inserted to each of the holes. However, in order to arrange the metal cylinder body, it is necessary to make a magnetic gap between the magnet piece and stator wide, so that there is a problem that the performance of the motor is reduced. Further, there is a problem that an eddy current is generated in the metal cylinder body and the motor efficiency is reduced. In the magnet interior type, because the rotor yoke exists in outer sides of the magnet pieces in the same manner, the magnetic gap becomes wide, and because the rotor yoke exists between the magnet pieces, all magnetic fluxes of the magnetic pieces do not make their way to the stator side, and the magnetic fluxes leak to the other magnet pieces in both sides via the rotor yoke, so that there is a problem that the performance of the motor is reduced.

Accordingly, the ring magnet is superior to the segment type magnet piece in that the magnet is prevented from being scattered. However, if the adhesive strength is weakened even in the case of employing the ring magnet, there is generated a problem that an idle running is generated with respect to the rotor yoke. On the contrary, there has been invented a structure in which a recess portion is formed in an end portion of an inner periphery of the ring magnet, a convex portion constituted by a key or a pin is provided in the rotor yoke, and the idle running is prevented by engaging the recess portion and the convex portion (for example, refer to Japanese Unexamined Patent Publication No. 2001-178042). Further, there has been invented a structure in which a protruding portion in an axial direction is formed in an inner periphery of the ring magnet, a recess portion in an axial direction is formed in an outer periphery of the rotor yoke, and the protruding portion and the recess portion are matched and fitted to each other, thereby preventing the idle running (for example, refer to Japanese Unexamined Patent Publication No. 2003-174745).

Because the compact structure and the high performance of the brushless motor have made progress, a neodymium type sintered ring magnet having a high magnetic flux density is frequently used in the rotor of the industrial high performance brushless motor. The sintered magnet is structured such that a magnetic field is formed in a magnet particle within a forming mold frame in which a core rod is arranged in a center of a cylindrical sleeve, however, an outer periphery and an inner periphery after forming is not formed in a complete round shape but formed in a polygonal shape or generates a strain, due to a thermal expansion and contraction caused by the sintering, and an orientation of the magnet particle. Accordingly, the outer peripheral surface and the inner peripheral surface of the ring magnet are ground so as to be finished in desired shape and size after being manufactured. However, in the case where the protruding portion, the recess portion and the like for fitting to the rotor yoke are formed in the inner periphery of the ring magnet as mentioned above, it is necessary to finish these protruding portion and the like in a desired dimensional precision, so that there is a problem that the grinding step becomes complicated, and a manufacturing cost is increased.

Further, the brushless motor having a high output has been used in an elevator, a power steering of a motor vehicle, and the like in place of the conventional hydraulic motor, however, in the brushless motor used for transporting a passenger or the like as mentioned above, it is necessary to prevent the idle running and the scattering from being generated as much as possible in view of a safety.

SUMMARY OF THE INVENTION

The present invention is made by taking the points mentioned above into consideration, and an object of the present invention is to provide a means which can securely prevent an idle running and a scattering of a magnet while restricting a manufacturing cost as much as possible, in a rotor used in a brushless motor.

In accordance with the present invention, there is provide a rotor for a brushless motor comprising:

a sintered ring magnet in which not-ground recess portions are formed in an axial direction of an inner peripheral surface in correspondence to a magnetic pole, and a portion between the recess portions is ground in an inner peripheral surface having a desired inner diameter;

a rotor yoke in which convex portions having a diameter greater than the inner diameter of the sintered ring magnet are formed in an axial direction of an outer peripheral surface in correspondence to the recess portions, and a through hole is pierced in an axial center, and which is concentrically adhered to the sintered ring magnet by fitting the recess portions and the convex portions; and a shaft inserted and fitted to the through hole of the rotor yoke.

Further, in accordance with the present invention, the sintered ring magnet is structured such that a magnetic field is formed in a polar anisotropy.

Further, in accordance with the present invention, the rotor is further provided with a protecting plate covering both end surfaces in an axial direction of the sintered ring magnet, and a protecting sheet covering at least an outer peripheral surface of the sintered ring magnet.

Further, in accordance with the present invention, the brushless motor is of an inner rotor type having the rotor for the brushless motor as a rotor.

In accordance with the rotor for the brushless motor concerning the present invention, because since the not-ground recess portions are formed in the axial direction of the inner peripheral surface of the sintered ring magnet, and the portions between the recess portions are ground in the desired inner diameter, the convex portions having a diameter greater than the inner diameter of the sintered ring magnet are formed in the axial direction of the outer peripheral surface of the rotor yoke in correspondence to the recess portions, and the sintered ring magnet and the rotor yoke are concentrically adhered by fitting the recess portions and the convex portions, it is possible to securely prevent the idle running and the scattering of the sintered ring magnet. Further, because the recess portions formed in the inner peripheral surface of the sintered ring magnet are not ground, it is possible to easily execute a grinding step and it is possible to restrict a manufacturing cost of the rotor for the brushless motor.

Further, in accordance with the present invention, because the inner peripheral surface is formed in a concavo-convex shape in correspondence to the magnetic pole in the axial direction due to the orientation of the magnetization by forming the magnetic fieled in the polar anisotropy in the sintered ring magnet, the recess portions may be easily formed.

Further, in accordance with the present invention, because the rotor is provided with the protecting plate covering both the end surfaces in the axial direction of the sintered ring magnet, and the protecting sheet covering at least the outer peripheral surface of the sintered ring magnet, it is possible to prevent small pieces from being scattered resulting from a crack of the end surface and the outer peripheral surface of the sintered ring magnet.

Further, in accordance with the brushless motor concerning the present invention, because the brushless motor is of the inner rotor type having the rotor for the brushless motor as the rotor, it is possible to securely prevent the idle running and the scattering of the sintered ring magnet and thus the brushless motor having a safety and a high output can be realized.

DESCRIPTION OF THE PREFERRED EMBODIMENTS

A description will be specifically given below of an embodiment in accordance with the present invention with reference to the accompanying drawings.

Figure 1:
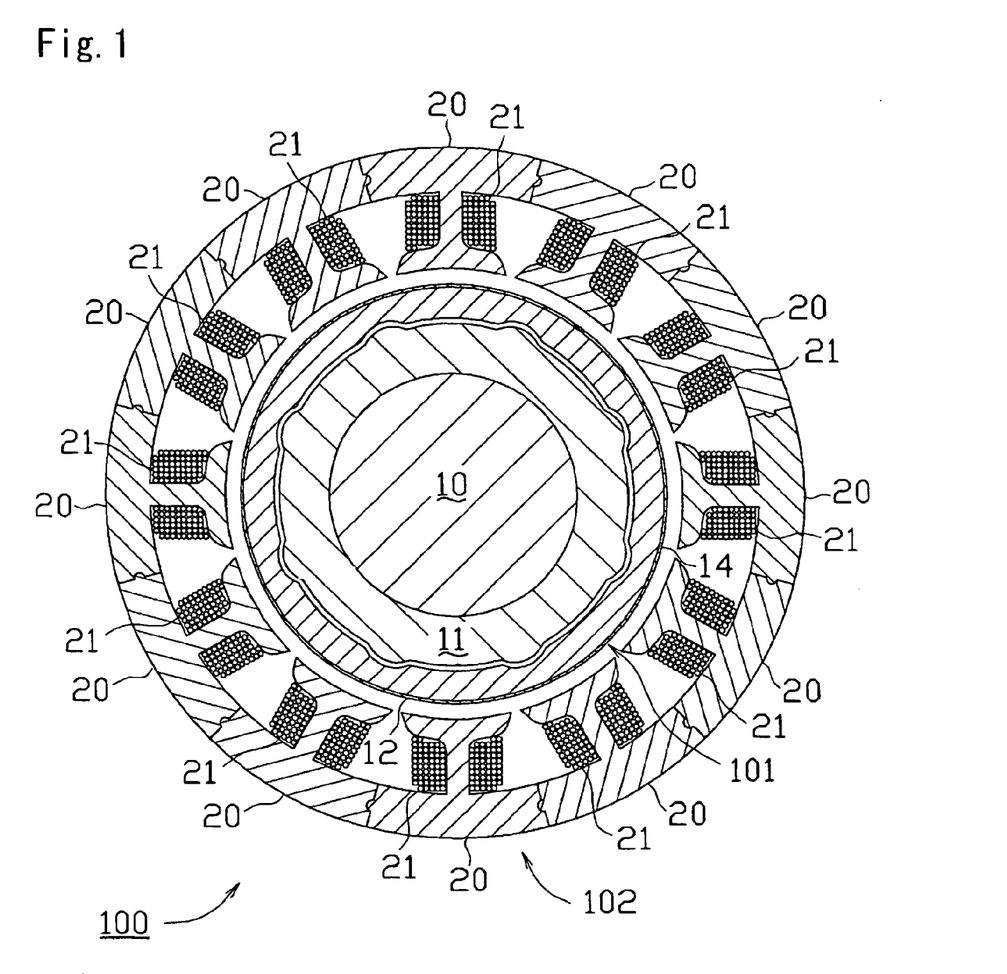
FIG. 1 is a cross sectional view showing a structure of a brushless motor 100 in accordance with an embodiment of the present invention.

A brushless motor 100 in accordance with an embodiment of the present invention is of an inner rotor type structured by an inner rotor and an outer stator. As shown in FIG. 1, the inner rotor is constituted by a rotor (a rotor for a brushless motor) 101, and the outer stator is constituted by a stator 102 in which separated cores 20 separated every teeth are annularly connected by a predetermined number, twelve in this case, and a coil 21 is wound around each of the teeth. The rotor 101 is rotatably arranged by forming a fixed gap in the stator 102.

Figure 2:
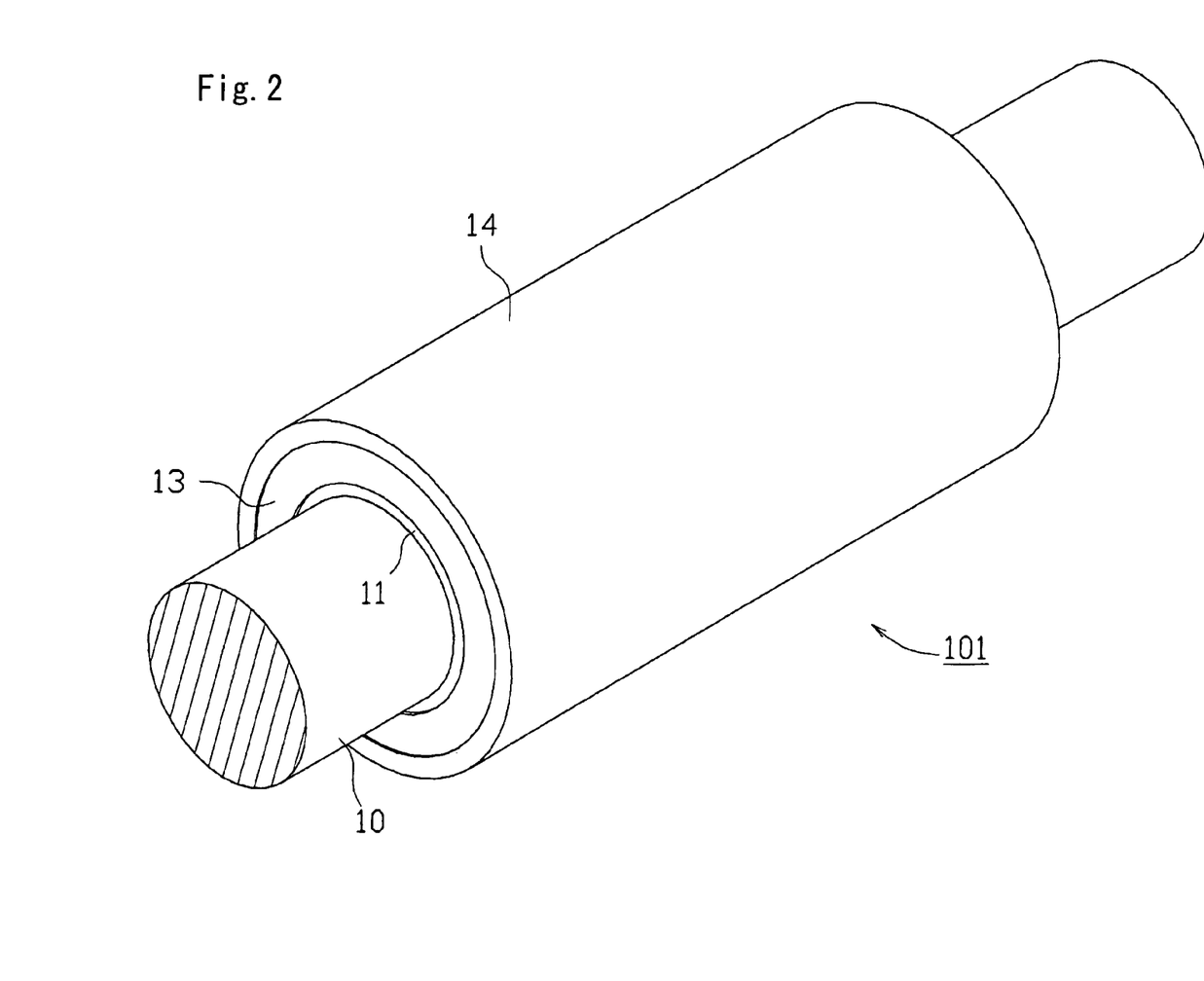
FIG. 2 is a perspective view showing a structure of a rotor 101.
Figure 3:
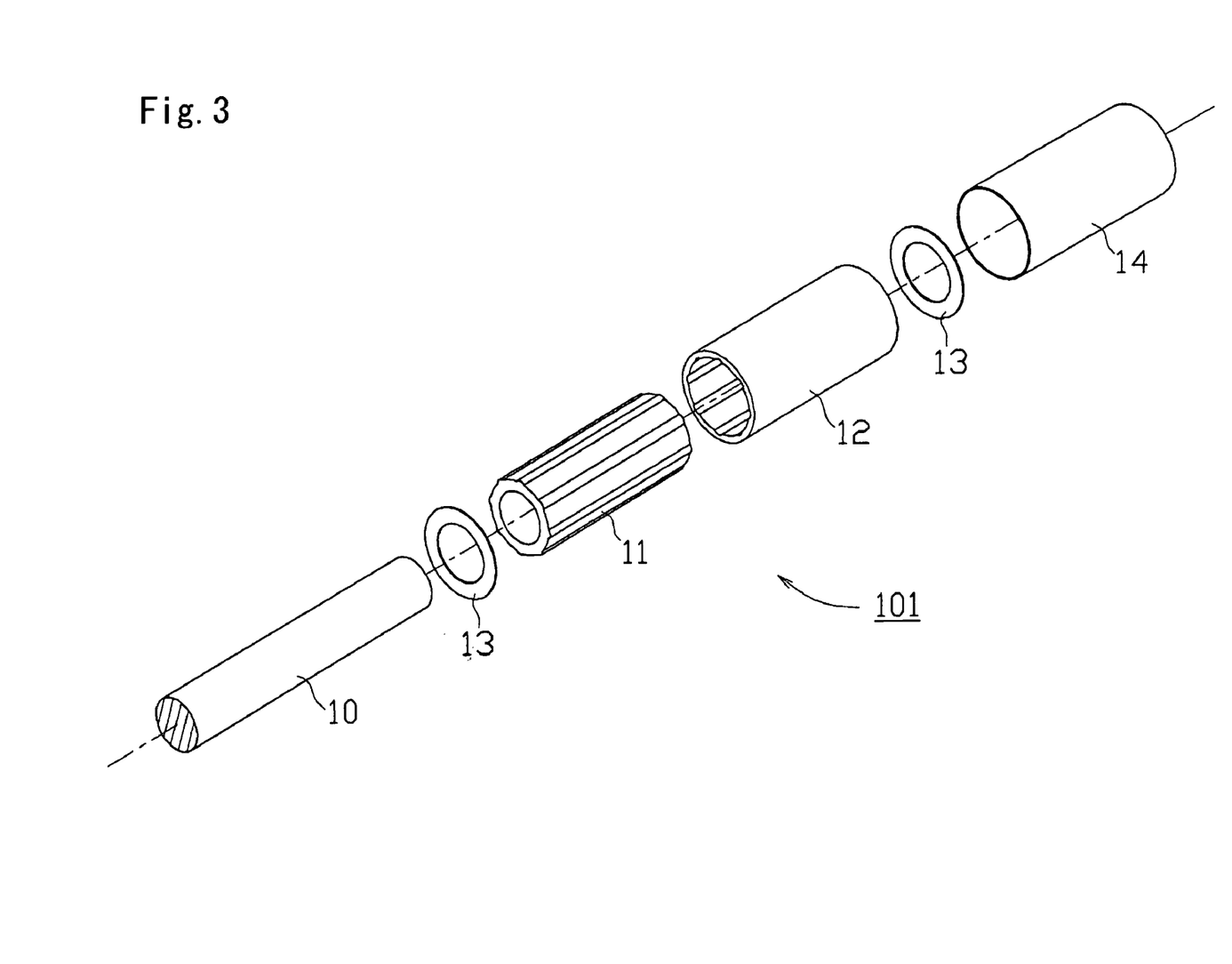
FIG. 3 is an exploded perspective view showing the structure of the rotor 101.

The rotor 101 is provided with a shaft 10 forming a shaft of the motor, a rotor yoke 11 concentrically provided in the shaft 10, a sintered ring magnet 12 provided in an outer periphery of the rotor yoke 11, a protecting plate 13 covering both end surfaces in an axial direction of the sintered ring magnet 12, and a protecting sheet 14 covering an outer peripheral surface of the sintered ring magnet 12, as shown in FIGS. 2 and 3.

Figure 4:
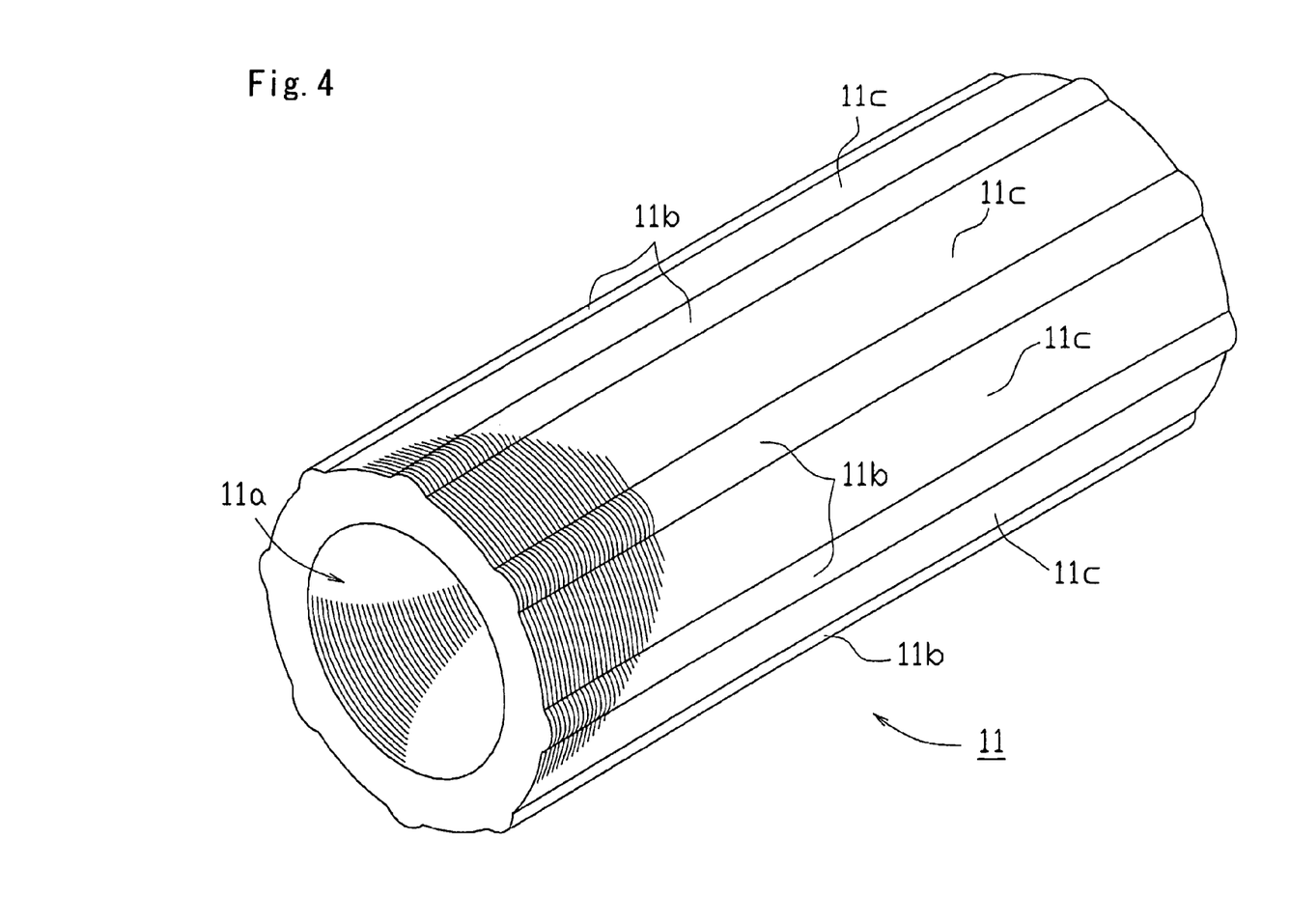
FIG. 4 is a perspective view showing a structure of a rotor yoke 11.

The rotor yoke 11 is integrally formed by laminating a steel plate punched in a disc shape by caulking or the like, as shown in FIG. 4. A through hole 11a for inserting the shaft 10 is formed in a center of the rotor yoke 11, and a protruding portion 11b corresponding to an inner peripheral shape of the sintered ring magnet 12 is formed in an outer periphery. Although a detailed illustration is omitted, concavity and convexity for caulking are formed in predetermined positions of the steel plate, and a predetermined number of steel plates are caulked so as to overlap the concavity and convexity and structure a cylindrical rotor yoke 11. The shaft 10 is inserted to the through hole 11a of the rotor yoke 11 and is fixed by shrink fitting or the like, and the sintered ring magnet 12 is outward fitted to the outer periphery of the rotor yoke 11. However, the fitting structure between the rotor yoke 11 and the sintered ring magnet 12 will be described later.

Figure 5:
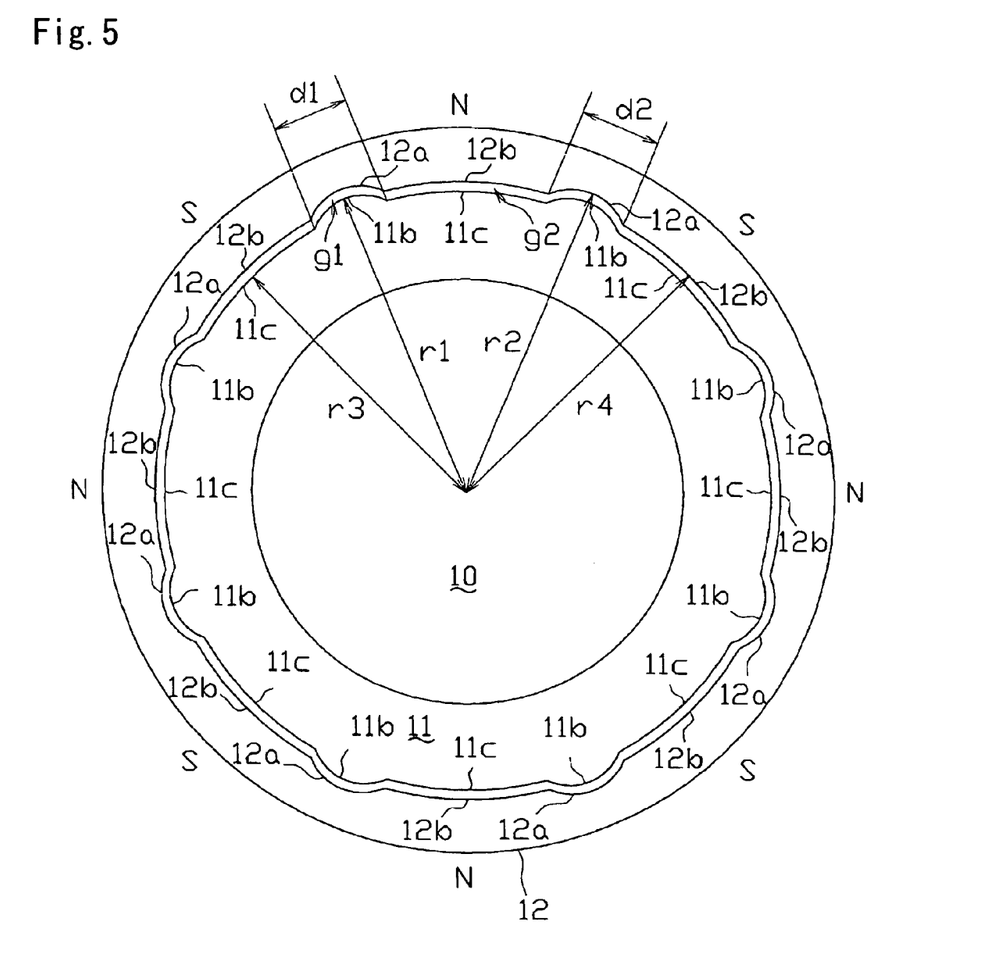
FIG. 5 is a front elevational view showing a fitting structure between a recess portion 12a and a protruding portion 11b.

The sintered ring magnet 12 is constituted by a permanent magnet in which magnet particles are sintered in a cylindrical shape, as shown in FIG. 5, and eight magnetic poles are formed in an outer peripheral surface in correspondence to the number of slots of the stator 102. Non-ground recess portions 12a are formed in an axial direction in correspondence to the magnetic pole in an inner peripheral surface, and portions between the recess portions 12a are ground in a desired inner diameter. The recess portions 12a are formed between the magnetic poles in the outer peripheral surface. Because the number of the magnetic poles of the present sintered ring magnet 12 is eight, eight recess portions 12a are formed. A shape and a magnitude of each recess portion 12a and an inner diameter between each of recess portions 12a are set on the basis of a relation with the protruding portions 11b of the rotor yoke 11, and the sintered ring magnet 12 is outward fitted to the outer periphery of the rotor yoke 11 by homologizing the recess portions 12a and the protruding portions 11b, and are fixed by an adhesive agent. A description will be in detail given below of the fitting structure between each of the protruding portions 11b of the rotor yoke 11 and the recess portions 12b of the sintered ring magnet 12.

As shown in FIG. 5, a thickness of the sintered ring magnet 12 becomes thin in an arc shape in the recess portion 12a, a width d2 thereof is equal to or smaller than a width d1 of the protruding portion 11b, and a maximum diameter r2 of the magnet is smaller by a predetermined size than a maximum diameter r1 of the protruding portion 11b. Accordingly, a gap g1 having a predetermined dimension is provided in a fitted state between the recess portion 12a and the protruding portion 11b, and the adhesive agent is filled in the gap g1. High dimensional precision is not required in the gap g1, and the dimension of the actual gap g1 may be slightly increased and reduced from the designed dimension as far as the rotor yoke 11 and the sintered ring magnet 12 can be fitted such that each of the protruding portions 11b is received in each of the recess portions 12a. Accordingly, it is not necessary to grind the recess portion 12a for securing the dimensional precision of the gap g1 after forming the sintered ring magnet 12 in accordance with a sintering method.

On the other hand, an inner diameter r4 of the inner peripheral surface 12b of the sintered ring magnet 12 between the recess portions 12a is smaller by a predetermined dimension than an outer diameter r3 of the outer peripheral surface 11c of the rotor yoke 11 between the protruding portions 11b, a gap g2 having a predetermined dimension is provided in a fitted state between the inner peripheral surface 12b and the outer peripheral surface 11c, and an adhesive agent is filled in the gap g2. However, because the sintered ring magnet 12 is concentrically fitted to the rotor yoke 11, a predetermined dimensional precision is required in the gap g2 so as to secure a fixed dimension. In other words, if a dimensional error is generated due to a deformation, a strain or the like at a time of sintering the sintered ring magnet 12, and a thickness between the recess portions 12a of the sintered ring magnet 12 is not constant, an eccentricity is generated in the rotor 101. Accordingly, it is necessary to make the thickness between the recess portions 12a constant so as to keep the gap g2 constant in order to prevent the eccentricity. Therefore, in order to secure the thickness between the recess portions 12a and the dimensional precision of the gap g2 after forming the sintered ring magnet 12 in accordance with the sintering method, it is necessary to grind a portion between the recess portions 12a. Further, the inner diameter r4 of the inner peripheral surface 12b between the recess portions 12a is smaller than the maximum diameter r1 of the protruding portion 11b. Accordingly, the protruding portion 11b does not come off from the recess portion 12a in a state in which the rotor yoke 11 and the sintered ring magnet 12 are fitted.

As mentioned above, because the sintered ring magnet 12 is fitted to the rotor yoke 11 by homologizing each of the protruding portions 11b and each of the recess portions 12a, and is fixed by filling the adhesive agent in the gaps g1 and g2, even if an adhesive force is lowered as a result of vibration and heat generation from the motor, a magnetic force applied between the rotor and the stator or the like, and the sintered ring magnet 12 is in a state of easily idle running with respect to the rotor yoke 11, the force in the idle running direction is applied not as a shear force but as a compression force to the adhesive agent filled in the gap g1. Therefore, it is difficult to generate the idle running as a result of the reaction force. Further, even if the force in the idle running direction is applied enough to compress the adhesive agent filled in the gap g1, the protruding portion 11b is brought into contact with the recess portion 12a, so that the protruding portion does not idle run further.

The sintered ring magnet 12 having the shape mentioned above is manufactured in such a manner that the sintered body in which the magnetic field is formed in the polar anisotropy is ground in the outer peripheral surface and a part of the inner peripheral surface so as to be magnetized.

Figure 6:
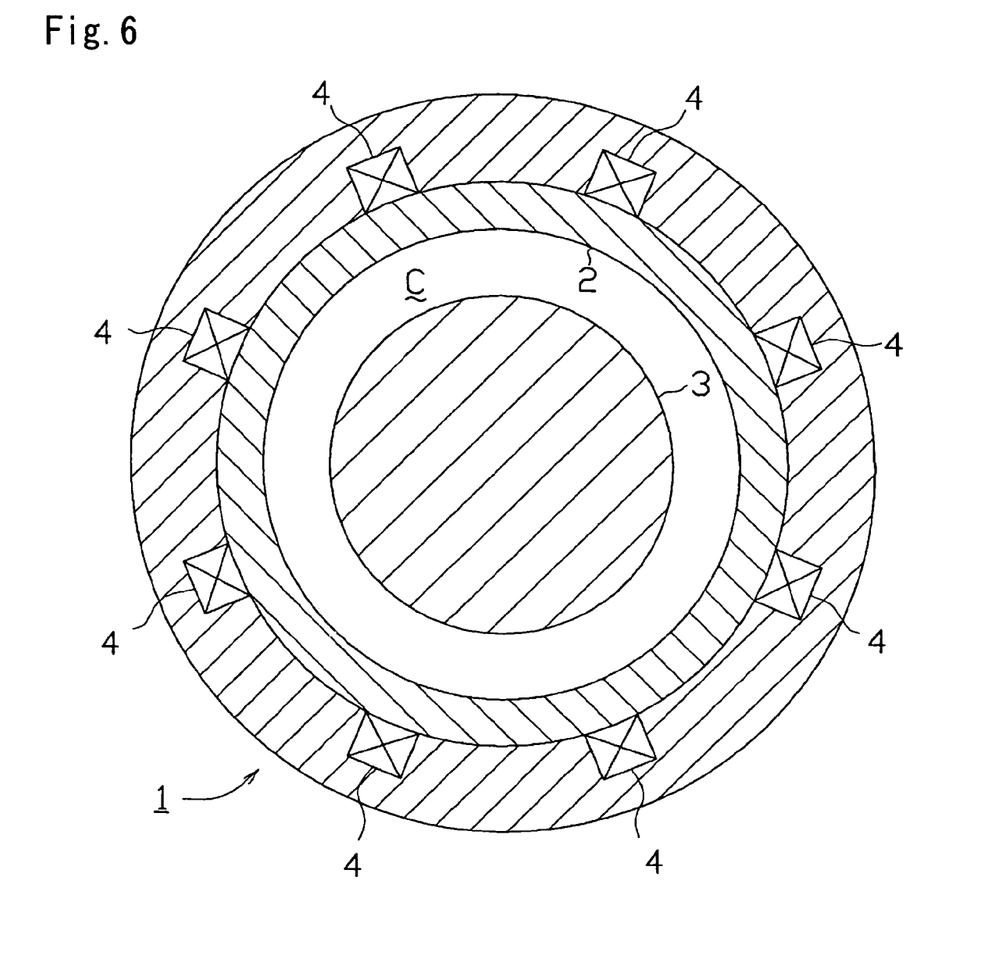
FIG. 6 is a cross sectional view showing an outline structure of a mold frame 1 for forming a magnetic field in a sintered ring magnet 12.

Described in more detail, the sintered body is structured such that the neodymium type magnet particles having a magnetic anisotropy are formed in a cylindrical shape within a forming space C in the mold frame 1, and the mold frame 1 is structured, as shown in FIG. 6, such that the cylindrical core rod 3 is arranged in a center of the cylindrical sleeve 2 and the forming space C having an annular cross section is formed. An electromagnetic coil 4 for applying a magnetic field is arranged in the outer periphery of the sleeve 2. Because the sintered ring magnet 12 of the present embodiment has eight poles, eight electromagnetic coils 4 are arranged at a uniform interval in a peripheral direction. A formation is executed by applying a pulse current to the electromagnetic coil 4 and applying a magnetic field to the forming space C, and thereafter a formed body is sintered at a predetermined temperature. Accordingly, there can be obtained a sintered body 5 in which an axis of easy magnetization is formed in a direction shown by a single-dot chain line in FIG. 7. The sintered body 5 is formed approximately in a cylindrical shape, an outer periphery of which is formed in an octagonal shape corresponding to the magnetic pole, and an inner periphery is formed in sixteen concavo-convex shapes in which a portion corresponding to the portion between the magnetic poles is constituted by a recess groove 5a in an axial direction and a portion corresponding to the magnetic pole is constituted by a convex groove 5b in an axial direction. This is because the magnetic particles are allocated along the magnetic field by forming the magnetic field in the magnetic particles having the magnetic anisotropy, however, an anisotropy is generated also in a density of the magnet particles and a coefficient of thermal expansion at a time of sintering on the basis of the allocation.

Figure 7:
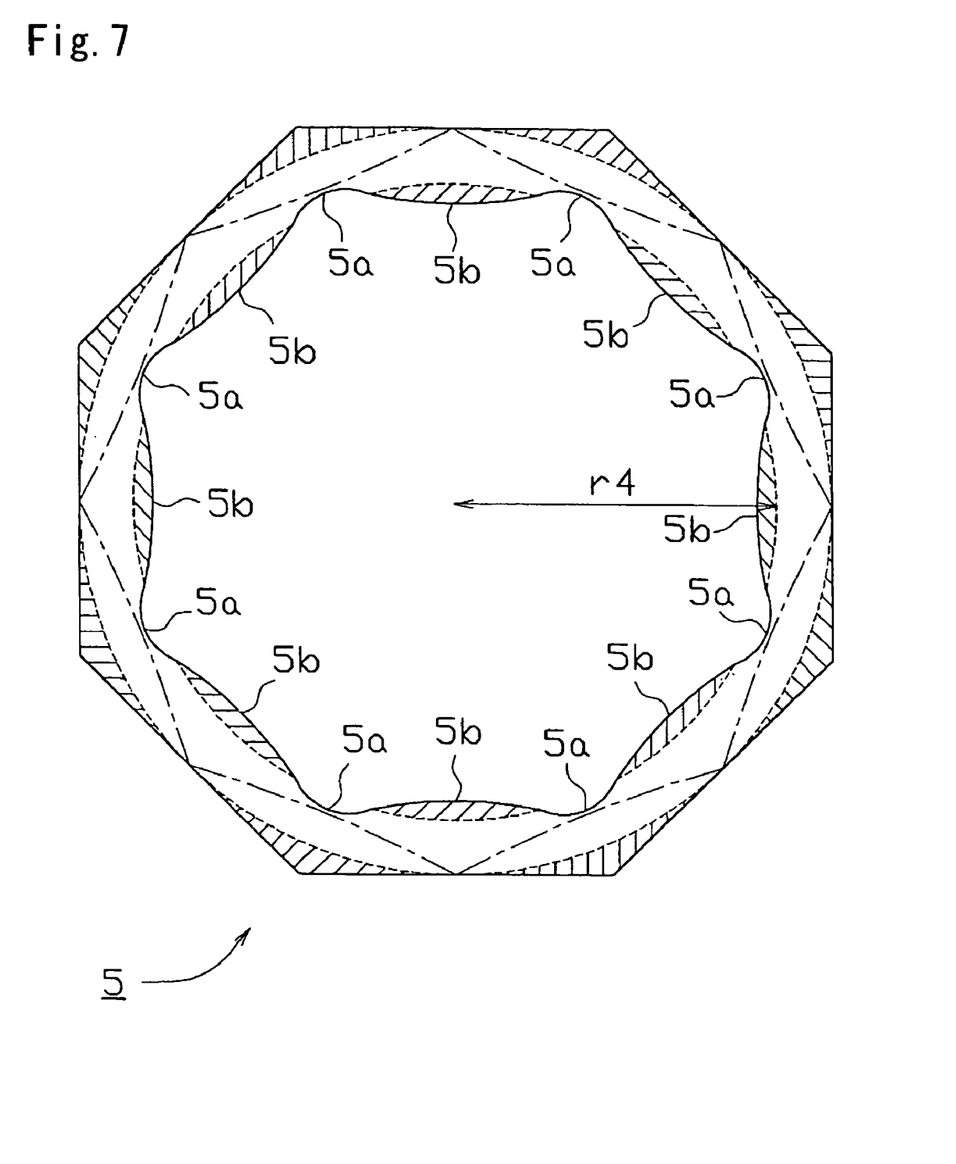
FIG. 7 is a front elevational view showing a shape of a sintered body 5.

As mentioned above, the sintered ring magnet 12 of the rotor 101 is opposed to the teeth of the stator 102 at the fixed gap, and a precision of the gap affects a performance of the brushless motor 100. Accordingly, a shaded portion in the drawing is ground in such a manner that the outer periphery of the sintered body 5 is formed as a complete round shape having a predetermined outer diameter and an outer peripheral surface is smooth. The grinding is executed, for example, by circularly moving a grinding body such as a grind stone rotated at a high speed or the like while being brought into contact with the outer peripheral surface of the sintered body 5, however, the other well-known and optional grinding methods may be employed.

On the other hand, because the recess groove 5a in the concavo-convex shape in the inner periphery of the sintered body 5 forms the recess portion 12a of the sintered ring magnet 12, the recess portion 12a does not require a high dimensional precision and an error about ±0.5 mm at a time of sintering is allowed, as mentioned above, the recess groove 5a is kept in the sintered state, however, as shown by the hatched line in FIG. 5, the convex groove 5b is ground so as to form the smooth inner peripheral surface 12b having the inner diameter r4. Thereafter, the sintered body 5 is magnetized in eight poles so as to be formed as the sintered ring magnet 12. Because the rotor yoke 11 outward fitting the sintered ring magnet 12 is constituted by the steel plate laminated body punched in the disc shape as mentioned above, the precision of the outer diameter r3 of the outer peripheral surface 11c is high. Accordingly, a difference between the outer diameter r3 of the outer peripheral surface 11c of the rotor yoke 11 and the inner diameter r4 of the inner peripheral surface 12b of the sintered ring magnet 12 is fixed to a predetermined dimensional precision by forming the inner peripheral surface 12b of the sintered ring magnet 12 precisely in the inner diameter r4 by grinding, the gap g2 is constant, and the rotor yoke 11 and the sintered ring magnet 12 are concentrically adhered precisely. Further, because the recess portion 12a of the sintered ring magnet 12 can employ the concavo-convex shape at a time of sintering without grinding, the grinding step can be simplified and the manufacturing cost can be restricted.

In this case, in the present embodiment, the core rod 3 arranged in the center of the mold frame 1 is formed in the cylindrical shape. However, for example, in the case where the concavo-convex shape in the inner periphery of the sintered body 5 in which the magnetic field is formed in the polar anisotropy is small, and the recess groove 5a thereof does not form the recess portion 12a having the desired-inner diameter r2, the protruding portion may be provided in each of the portions corresponding to the portion between the magnetic poles in the outer periphery of the core rod 3, and the inner periphery of the sintered body 5 may be more positively formed in the concavo-convex shape.

As mentioned above, the disc-like protecting plate 13 is arranged in both end surfaces in the axial direction of the sintered ring magnet 12 adhered to the outer periphery of the rotor yoke 11, as shown in FIGS. 2 and 3. The protecting plate 13 is constituted by the thin plate having a diameter approximately equal to the outer diameter of the sintered ring magnet 12, and a through hole 13a for inserting the shaft 10 is pierced in the center thereof. The through hole 13a has a diameter greater than the shaft 10, and the diameter can be optionally set in such a range that the protecting plate 13 can cover the gaps g1 and g2 between the rotor yoke 11 and the sintered ring magnet 12.

Further, the protecting sheet 14 is provided so as to cover the outer peripheral surface of the sintered ring magnet 12 and the outer peripheral edge portion of the protecting plate 13. The protecting sheet 14 is constituted by a resin cylindrical sheet contracted by heating, and is preferably constituted by a thin structure in such a manner as to prevent the gap between the rotor 101 and the stator 102 from being increased, in particular, a structure having a thickness between about 0.1 and 0.2 mm. The protecting sheet 14 is put so as to cover the sintered ring magnet 12 in which the protecting plate 13 is arranged in both ends so as to be heated and contracted, and is closely contacted to the outer peripheral surface of the sintered ring magnet 12 and the outer peripheral edge portion of the protecting plate 13. Because the end surface and the outer peripheral surface of the sintered ring magnet 12 are covered by the protecting plate 13 and the protecting sheet 14, it is possible to prevent the small piece from being scattered as a result of the chip of the sintered magnet 12 and it is possible to achieve a corrosion preventing effect of the sintered ring magnet 12. Further, because the protecting plate 13 covers the gaps g1 and g2 between the rotor yoke 11 and the sintered ring magnet 12, the adhesive agent is not extruded from both end surfaces of the sintered ring magnet 12 in the case where the force in the idle running direction is applied to the sintered ring magnet 12 and the adhesive agent filled in the gap g1 is compressed, so that it is possible to more firmly prevent the idle running.

As mentioned above, in accordance with the present rotor 101, since the convex portion 11b in the outer peripheral surface of the rotor yoke 11 and the recess portion 12a of the sintered ring magnet 12 are fitted, and the rotor yoke 11 and the sintered ring magnet 12 are concentrically adhered, it is possible to securely prevent the sintered ring magnet 12 from idle running and being scattered. Further, it is possible to achieve the brushless motor 100 having a safety and a high output by forming the rotor 101 as the inner rotor. This kind of brushless motor 100 can be preferably used as an industrial motor requiring a high safety such as a motor for an elevator, a power steering of a motor vehicle and the like.

In this case, the structure of the brushless motor 1 in accordance with the present embodiment is shown as one example, and it goes without saying that the brushless motor can be appropriately changed within the scope of the present invention, for example, the polar number of the motor is increased or reduced from eight poles, the stator 102 is constituted by an integrally formed magnetic steel plate laminated body in place of the separated core 20, and the like.

What is claimed is:

1. A rotor for a brushless motor comprising:
   a sintered ring magnet in which not-ground recess portions are formed in an axial direction of a inner peripheral surface in correspondence to a magnetic pole, and a portion between said recess portions is ground in an inner peripheral surface having a desired inner diameter;
   a rotor yoke in which rounded convex portions protruding radially outwardly and having a diameter greater than the inner diameter of said sintered ring magnet are formed in an axial direction of an outer peripheral surface in correspondence to said recess portions, and a through hole is pierced in an axial center, and which is concentrically adhered to said sintered ring magnet by fitting said recess portions and the convex portions; and
   a shaft inserted and fitted to the through hole of said rotor yoke.

2. A rotor for a brushless motor as claimed in claim 1, wherein said sintered ring magnet has a structure such that a magnetic field is formed in a polar anisotropy.

3. The rotor for a brushless motor as claimed in claim 1 or 2, wherein the rotor is further provided with a protecting plate covering both end surfaces in an axial direction of said sintered ring magnet, and a protecting sheet covering at least an outer peripheral surface of said sintered ring magnet.

4. A brushless motor comprising an inner rotor type brushless motor having the rotor for the brushless motor as claimed in any one of claims 1 to 3 as a rotor.

5. The rotor for a brushless motor as claimed in claim 2, wherein the rotor is further provided with a protecting plate covering both end surfaces in an axial direction of said sintered ring magnet, and a protecting sheet covering at least an outer peripheral surface of said sintered ring magnet.

6. A brushless motor comprising an inner rotor type brushless motor having the rotor for the brushless motor as claimed in claim 2 as a rotor.

7. A brushless motor comprising an inner rotor type brushless motor having the rotor for the brushless motor as claimed in claim 3 as a rotor.

8. A brushless motor comprising an inner rotor type brushless motor having the rotor for the brushless motor as claimed in claim 5 as a rotor.

* * * * *